F. B. ADAM.
FLOOR BOX.
APPLICATION FILED APR. 10, 1916.
1,254,641.
Patented Jan. 22, 1918.
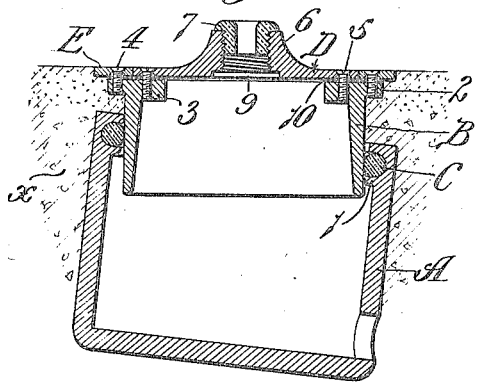
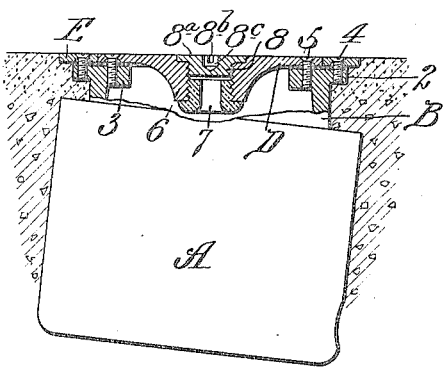
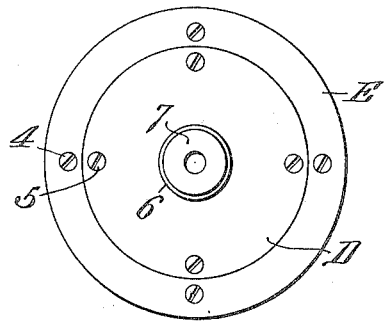
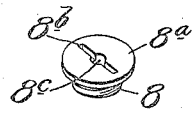
Inventor,
Fredrick B. Adam.
By Bakewell Church attys.

UNITED STATES PATENT OFFICE.

FREDRICK B. ADAM, OF ST. LOUIS, MISSOURI, ASSIGNOR TO FRANK ADAM ELECTRIC COMPANY, OF ST. LOUIS, MISSOURI, A CORPORATION OF MISSOURI.

FLOOR-BOX.

1,254,641.  Specification of Letters Patent.  Patented Jan. 22, 1918.

Application filed April 10, 1916.  Serial No. 90,131.

*To all whom it may concern:*

Be it known that I, FREDRICK B. ADAM, a citizen of the United States, residing at St. Louis, Missouri, have invented a certain new and useful Improvement in Floor-Boxes, of which the following is a full, clear, and exact description, such as will enable others skilled in the art to which it appertains to make and use the same.

This invention relates to electrical outlet boxes such as are used in floors, walls and ceilings for housing conductors, receptacles and other kinds of electrical apparatus, and particularly to floor boxes of the type that comprise a lower portion and an upper portion that can be adjusted vertically and also tilted relatively to said lower portion, so that the cover of the box will be flush or parallel with the top surface of the floor, ceiling or wall in which the box is installed.

One object of my invention is to provide a floor box of the general type mentioned that is strong and servicable, inexpensive to manufacture, easy to install and adjust and absolutely water-tight when installed in operative position in a floor.

Another object is to provide a floor box that will take any standard receptacle or receptacle body and whose interior is large enough to enable the electrical conductors to be inserted or withdrawn without removing the upper portion of the box or the finishing plate or ring that surrounds the removable cover of the box.

Another object is to provide a floor box that comprises a reversible member which forms a flat cover plate for the box when arranged in one position, and when reversed or turned upside-down it forms a cover provided with a nozzle or raised support for an insulator bushing that is adapted to receive a cord or electrical conductor leading out of the box.

And still another object is to provide a floor box of the general type previously referred to in which the vertical adjustment and tilting of the upper portion of the box, the temporary holding of said upper portion in adjusted position during the operation of molding the floor around the box and the water-tight connection between the upper and lower portions of the box is effected without the use of coöperating screw threads on said parts or independently adjustable fastening devices.

To this end I have devised a floor box in which the upper and lower portions of the box are secured together by a friction member that forms a water-tight joint between said parts, said friction member being so designed and arranged that it will securely hold the upper portion of the box in adjusted position and still permit said upper portion to be moved easily, either upwardly, downwardly or into an angular position when it is desired to change the position of same with relation to the lower portion of the box during the operation of molding a concrete or similar floor around the box. The cover of the box preferably consists of a reversible plate provided on one side with a flat surface and on the other side with an integral raised portion that forms the nozzle for an insulator bushing, the hole in said bushing being closed when the bushing is not in use by a removable plug in the cover.

Figure 1 of the drawings is a vertical sectional view of a floor box constructed in accordance with my invention, illustrating the cover arranged with its nozzle projecting upwardly.

Fig. 2 is a side elevational view of said box, partly in section, illustrating the cover reversed or arranged with its flat surface presented upwardly.

Fig. 3 is a top plan view of the box shown in Fig. 1; and

Fig. 4 is a perspective view of the removable plug in the cover.

Referring to the drawings, which illustrate the preferred form of my invention, A designates the lower portion of the box which is usually set in the floor *x* before the top surface of the floor is finished, and B designates the upper portion of the box. The lower portion is provided at its upper end with a circular opening and the upper portion is provided with a tubular-shaped part that projects downwardly into said opening, said tubular part being enough smaller than the opening in the lower portion A to telescope inside of same but still be capable of assuming an angular position with relation to said lower portion, as shown in Fig. 1.

A friction member C, formed of rubber or some other suitable packing material and preferably consisting of a ring that is round in cross section, is arranged between the telescoped portions A and B of the box, so as to hold the upper portion B in adjusted position and also form a water-tight joint between said parts. In the form of my invention herein shown the circular opening in the bottom portion A of the box is formed in a flange or thick rim 1 provided with an annular recess that receives the packing member C, said recess conforming approximately to the cross-sectional shape of the packing ring C, so that all except a very slight portion at the inner side of said ring will be housed in the rim 1. The top portion B of the box is provided at its upper edge with an outwardly-projecting flange or a plurality of laterally-projecting lugs 2, and said upper portion is also provided at its upper edge with an inwardly-projecting flange or a plurality of laterally-projecting lugs 3, so as to form a substantial supporting surface and also an anchoring means for the reversible cover D of the box and for the finishing ring E that surrounds said cover. The finishing ring E consists of a thin, flat metal ring that is adapted to be set in the floor with its top surface flush with the top surface of the floor, and said ring is connected to the upper portion B of the box by means of screws or other suitable fastening devices 4 that are tapped into the flange or outwardly-projecting lugs 2 on said upper portion, the cover D being retained in position by screws or other suitable fastening devices 5 that are tapped into the flange or inwardly-projecting lugs 3 previously referred to. The cover D consists of a plate which is provided on one side with a flat surface and on its other side with an integral projection 6 that forms a nozzle or upwardly-projecting support that is adapted to receive an insulator bushing 7 which is screwed into a hole that extends completely through the cover, as shown in Fig. 1. When it is desired to connect a cord or electrical conductor to an electrical device (not shown) arranged in the lower portion of the box, the cover D is arranged in the position shown in Fig. 1 and the cord is run into the box through the insulator bushing 7 in the cover. When the box is not in use the cover D is reversed or turned over, as shown in Fig. 2, and the opening in the cover in which the insulator bushing is arranged is closed by a removable plug 8 that is screwed into said opening, as shown in Fig. 2, the plug 8 being preferably provided with a flat head 8ª that fits snugly in a recess 9 formed in the flat face of the cover, which head 8ª has a notch or groove 8ᵇ in which a screwdriver or other suitable tool can be inserted so as to screw the plug 8 into and out of operative position. If desired, the plug 8 may be provided at its center with a recess 8ᶜ that is adapted to receive the point of a bit, auger or other suitable boring tool used to form a round hole or depression in the top surface of the floor to receive the finishing ring E of the box. This is a very desirable feature of my box, as it makes it possible to easily form a hole in the top surface of the floor for the finishing ring, which hole is perfectly centered and of the exact size to receive the ring E snugly.

A floor box of the construction above described can be manufactured at a low cost on account of its simple construction, and on account of the fact that screw threads are not used to connect the two portions of the box together. The top portion of the box can be set perfectly flush and level with the top surface of the finished floor, even though the lower portion of the box is not set level, and when finishing the top surface of the floor it is not necessary to block up the top portion of the box or use spacing devices to temporarily support said top portion, owing to the fact that the friction member C securely holds the top portion of the box in adjusted position. After the floor has been finished and concrete grouting or similar material has been poured all around the upper portion of the box so as to support and retain it in position, it will be absolutely impossible for the upper portion of the box to move out of position or water to seep through the joint between the two portions of the box, and still another desirable feature of such a box is that the finishing ring E remains embedded in the top surface of the floor after the box has been installed and does not have to be removed whenever the cover of the box is opened. The interior of the box is large enough to take any standard receptacle or receptacle body, and furthermore, it is of sufficient size to permit the electrical conductors to be run into the box or withdrawn therefrom without removing the upper portion of the box or the finishing ring that surrounds the cover. By making the nozzle and cover in one piece instead of two separate pieces connected together by one or two screw threads, as has heretofore been the general practice I simplify the construction of the box, reduce the cost of manufacturing same and also reduce the liability of water leaking into the box after it has become old. Furthermore, such a construction insures the nozzle of the box that supports the insulator bushing being always in a position where it can be found when it is desired to run a cord into the box through the cover of same. When the nozzle of the box is in use, or, in other words, when the cover is arranged in the position shown in Fig. 1, the removable plug 8 can be kept in the lower portion of the box, so that it will be ready for use when it is desired to reverse the cover, as shown in Fig. 2. In order to insure an absolutely water-tight joint between the cover and the top portion of the box, I prefer to arrange a gasket 10 of rubber or other suitable material underneath the cover and the finishing ring E, as shown in Figs. 1 and 2.

While my invention is particularly applicable to floor boxes, I wish it to be understood that it is equally applicable to boxes that are arranged in walls and ceilings for housing electrical outlets.

Having thus described my invention, what I claim and desire to secure by Letters Patent, is:

1. An outlet box, comprising a lower portion provided at its upper end with a circular opening, an upper portion provided with a tubular part that projects downwardly into said opening and which is enough smaller than said opening to permit the upper portion to be arranged in an angular position with relation to said lower portion, a rim on said lower portion provided on its inner edge with an annular groove, and a friction ring, substantially round in cross section arranged in said groove so that it will surround the tubular part of said upper portion and exert sufficient frictional pressure on same to temporarily hold it in adjusted position during the operation of installing the box.

2. An outlet box, consisting of a hollow member that is adapted to be set in a floor, wall or ceiling, a reversible cover for said member, both sides of which are finished so that the cover will present an ornamental appearance when either side of same is exposed to view, and an integral nozzle or perforated projection on one side of said cover through which an electrical conductor can be led into the interior of the box.

3. An outlet box, consisting of a hollow member that is adapted to be set in a floor, wall or ceiling, a reversible cover for said member, both sides of which are finished so that the cover will present an ornamental appearance when either side of same is exposed to view, an integral nozzle or perforated projection on one side of said cover through which an electrical conductor can be led into the interior of the box, and a plug screwed into the opposite side of said cover and set flush with same so as to serve as a closure for said nozzle when the nozzle is not in use.

4. An outlet box, comprising a lower portion provided at its upper edge with an annular flange that has a groove formed in the inner edge of same, a packing ring in said groove, an adjustable top portion provided with a tubular part that projects downwardly through said packing ring and which fits inside of same snugly enough to cause the top portion to remain in adjusted position during the operation of installing the box, a reversible cover for said top portion provided on one side with an integral nozzle or perforated projection and having its opposite side finished, thus enabling either side of the cover to be exposed to view, laterally-projecting devices on said top portion, and a relatively thin floor plate detachably connected to said devices and having its top face flush with the top face of said cover.

In testimony whereof I hereunto affix my signature in the presence of two witnesses, this seventh day of April 1916.

FREDRICK B. ADAM.

Witnesses:
WELLS L. CHURCH,
GEORGE BAKEWELL.